US006354975B1

United States Patent
Thoma

(10) Patent No.: US 6,354,975 B1
(45) Date of Patent: Mar. 12, 2002

(54) COMBINED HYDROSTATIC AND GEAR TRANSMISSIONS EMPLOYING INDEPENDENT SUMPS

(75) Inventor: Christian Helmut Thoma, Jersey (GB)

(73) Assignee: Hydro-Thoma Limited, Jersey (GB)

( * ) Notice: Subject to any disclaimer, the term of this patent is extended or adjusted under 35 U.S.C. 154(b) by 6 days.

(21) Appl. No.: 09/641,427

(22) Filed: Aug. 18, 2000

(51) Int. Cl.$^7$ .............................................. F16H 47/04
(52) U.S. Cl. ......................................................... 475/83
(58) Field of Search ............................................ 475/83

(56) References Cited

U.S. PATENT DOCUMENTS

| 4,987,796 | A |   | 1/1991  | von Kaler et al. |         |
|-----------|---|---|---------|------------------|---------|
| 5,078,659 | A | * | 1/1992  | von Kaler et al. | 475/78  |
| 5,090,949 | A |   | 2/1992  | Thoma et al.     |         |
| 5,125,291 | A | * | 6/1992  | Makita et al.    | 74/730.1|
| 5,259,194 | A | * | 11/1993 | Okada            | 60/456  |
| 5,809,845 | A | * | 9/1998  | Shimizu          | 74/606 R|

OTHER PUBLICATIONS

"Fawcett Breather Bags For Fluid Protection", Fawcett Engineering Limited, pp. 1–4.
Product brochure on Angst & Pfister, pp. 1–9.

* cited by examiner

Primary Examiner—Dirk Wright
(74) Attorney, Agent, or Firm—Young & Thompson

(57) ABSTRACT

A hydrostatic power transmitting device in combination with a speed reducing apparatus together disposed within a common housing having an interior space divided by partitioning device into a first region in which the hydrostatic unit is disposed and a second region in which said speed reducer is accommodated. First and second regions are segregated from each other by the partitioning device being in the form of a flexible non-porous barrier. The elastically deformable partitioning device can therefore adjust its shape to take up any change in the amount of hydrostatic transmitting fluid in the first region due to temperature changes of the fluid and facilitates the regulation in depth of lubricant held by the second region. Thereby an initially low level of lubricant in the second region lessens the adverse effect of power-retarding drag losses, especially during cold weather winter operation, and a rising level of lubricant ensures good lubrication when temperatures are elevated and viscosity is low. Preferably the second region is sealed from the environment, and the above atmospheric positive pressure in the second chamber aided or induced by the expanding volume of fluid in the first region provides a net increase of pressure experienced by low-pressure side of the closed-loop circuit of the hydrostatic transmission.

20 Claims, 7 Drawing Sheets

COMBINED HYDROSTATIC AND GEAR TRANSMISSIONS EMPLOYING INDEPENDENT SUMPS

BACKGROUND OF THE INVENTION

1. Field of the Invention

This invention relates to hydrostatic power transmitting and speed reducing equipment having independent sumps which are useful in many diverse applications, one being for instance, a vehicle drive-line of the type generally known as a hydrostatic transaxle. This invention is particularly concerned with an improved transmission or transaxle having a housing with an interior space divided by a partitioning device into a first internal volume for the hydrostatic transmission mechanism and its associated operating fluid and a second internal volume accommodating a speed reduction mechanism in the form of a lubricated gear train.

2. Description of Related Art

Hydrostatic transaxles are increasingly being used in lawn care and other outdoor power equipment duties such as snow-blowing and have become the preferred choice for power transmission drive lines; for example, in lawn and garden tractors with most employing a single hydraulic pump fluidly connected to a single hydraulic motor. Although in most instances single motor hydrostatic transmissions are coupled by speed reduction gearing to a mechanical differential, applications also exist where two hydraulic motors are used and where each hydraulic motor is connected by a respective gear train to axle output shafts. Furthermore, two hydraulic pumps can also be used with two such hydraulic motors to create a hydrostatic transmission for each drive wheel which can be useful for zero-turn radius vehicle applications. Occasionally, single motor hydrostatic transmissions are used without the addition of a mechanical differential, such that the hydraulic motor is coupled by speed reduction gearing to a single output shaft, and in these instances, the output shaft may be the axle driving one wheel of the vehicle or be arranged to drive the axle of the vehicle by an interconnecting chain drive.

All hydrostatic transmission require hydrostatic power transmission fluid in order to operate and the fluid acts as the medium to convey power between the pump and motor of the hydrostatic transmission. As the positive displacement fluid pumping mechanisms used by all hydrostatic transmissions and hydrostatic transaxles require careful and accurate manufacture to achieve the necessary close tolerance fits in order to minimize internal fluid leakage losses associated with high-pressure performance, a preferred practice is to prevent damaging contamination generated by general wear and tear in the power transmitting gear train from reaching the pressurized circuit of the hydrostatic transmission. By removing the chances for damaging particles of contamination from entering the hydrostatic pressurized circuit, especially important when sintered powder-metal gears are used in the gear train, a long and useful working life for the hydrostatic transmission can be expected.

Although by no means essential, it can nevertheless be desirable to position the hydrostatic mechanism in a fluid compartment which is physically separate from any adjacent compartments in which the gear train is located such that no exchange of fluid can take place and whereby damaging contamination in the gear train compartment remains confined to that compartment. Contamination containment by way of separate compartments is shown in U.S. Pat. No. 5,090,949 titled Variable Speed Transaxle, expressly incorporated herein by reference. Here. a bulkhead is provided in the housing which carries a shaft seal, the shaft seal operating on the interconnecting drive shaft which mechanically couples the motor of the hydrostatic transmission in the hydrostatic compartment to the first reduction gear of the gear train in the adjacent gear train compartment. Further quantifiable benefits are gained as the compartment providing the sump for the gear train need only contain the bare minimum quantity of oil to satisfy lubrication considerations. Thus by relying on what in effect is "splash lubrication", expense is saved as the quantity of fluid needed is less and the efficiency of power transmission is improved as the associated drag losses of the fluid contacting the rotating gears is much less then with a sump carrying a full capacity of oil.

On the other hand, with some hydrostatic transaxles, the hydrostatic transmission is arranged to operate within the same oil bath as the speed reduction gearing (and mechanical differential when included) and such designs are commonly referred to as "common sump" types. Typically, the gear train and the hydrostatic transmission lie adjacent one another at the same elevation and the oil level in the sump is kept near to the brim to ensure that the hydrostatic components remain properly submerged at all times and also to avoid any ingestion of air. With a gear train operating submerged in the oil bath, power losses are greater due to the increase in fluid friction associated with the wetted area in contact with the oil than would be the case with the "splash lubrication" types mentioned earlier. Such gear drag losses can be especially noticeable in winter time when the gears are required to revolve from rest in a sump where the oil can be in an extremely viscous initial state, and the resulting higher than normal operational loads imposed on the components in the drive train are unavoidable. As it is not possible to select oils with different properties in the common sump design, a problem is posed as the optimum fluid type which would normally be selected as the preferred lubricant for a gearbox will have completely different characteristics as compared to the type of power transmission fluid most suited for the efficient operation of a hydrostatic transmission. Typically, a gear oil tends to be thicker with a high viscosity range whereas an automatic transmission fluid ("ATF") tends to be much thinner with a lower viscosity curve. As the hydrostatic transmission normally prevails when a conflict in design arises, it is accepted that the gear train may be operated in a generally adverse environment of low viscosity fluid such that accelerated wear and resulting higher contamination levels are more likely. The common sump design has the further limitation in that grease cannot be employed as the lubricant for the gear train. For certain applications, grease can be a more economic choice of lubricant.

Under normal atmospheric conditions, hydraulic fluids contain about 9% by volume of dissolved air which has virtually no effect on the physical properties of the fluid and therefore does not lead to any reduction in the performance of the system. However, should any appreciable quantity of undissolved air be present, the fluid will be prone to foaming problems, especially should the fluid experience excessive agitation, for instance, by any revolving elements such as gears being operated in only a partially submerged condition in the fluid sump. If such foaming occurs, it will rapidly lead to the destruction of the hydrostatic transmission.

It is also a physical characteristic of the fluid to expand and contract in volume in relation to changes in its temperature. In general terms, the volume of oil increases by about 0.7% for every increase in temperature of 10° C., and as hydrostatic transaxles can operate at below sub-zero ambient temperatures as well as on occasion above 100° C. oil temperature, it is necessary to include an additional dead space volume of about 8% to allow for such volume expansion over its initially contracted volume state. Accordingly, the fluid level in the sump rises and falls in relation to such temperature variation.

Quite often, an external expansion tank is fitted to the transaxle housing to allow for such expansion and contraction of the hydrostatic fluid. However, an external expansion tank can be troublesome as it is most often situated directly above the transaxle where little space exists. Frequently the space available under the frame of the vehicle is needed for rear-discharge ducts for the grass clippings. Therefore, there is often an advantage in casting the housing such that an additional space or void can be incorporated internally such that the need for an external expansion tank is avoided. Incorporating a breather vent in the housing directly above the void will allow the free flow of atmospheric air in either direction depending on temperature condition of the oil, and usually such a breather vent is positioned near or adjacent to where the largest gear resides, most often the ring gear of the differential. This works well so long as the air present in the void does not become too mixed up with the oil by rotating elements such as gears before the oil has sufficiently warmed to expel the air pocket from the void. Furthermore, as more oil has to be carried in a common sump transaxle as compared to a design having separate and distinct chambers for the hydro and gearing as mentioned earlier, a larger dead space volume has to be included to take care of the resulting increased volume expansion. Often, as the oil warms up towards its normal operating temperature, its expanded volume is not yet at a maximum, and, consequently, the remaining void or space situated in close proximity with the highest positioned gear still contains some air. This can cause considerable trouble as the gear, as its breaks through the surface of the oil, induces excessive agitation in the fluid, and the resulting mixture of air and oil in the sump can lead to foaming of the oil. Should such mixing occur to any great degree, this can be detrimental to the performance of the hydrostatic transmission as well as result in cavitation erosion on the load carrying bearing surfaces accompanied by pressure shocks and noises. The problem is further compounded should the undissolved air in the form of foam escape via the breather to pollute the environment.

A further problem can occur should the sump not be filled with the correct level of oil, as too low a level of oil can later cause the oil to aerate and foam when the transaxle is operated, whereas too much oil can result in it being expelled to the environment via the breather passage once it has expanded due to temperature rise. A typical problem encountered with vertical input shaft machines should the oil level be low is premature failure of the related bearing or seal due to a lack of lubrication. Furthermore, such naturally vented aspirated hydrostatic transaxles once left to cool after use in humid atmospheric conditions, draw moist air through the breather as soon as the oil begins to contract in volume and often this results in mist in the form of condensation of water vapor forming on the walls of the sump. Such entrained moisture, if not at once expelled as steam by the hot oil when the transaxle is once more in use, can even in small quantities over a period of time accelerate sludging of the oil by forming emulsions and by promoting the coagulation of insolubles such as dust particles that are also drawn through the breather as particles of solid matter as the unit cools after use. In general, air entering the sump causes the gradual oxidation of the oil and this deterioration in the lubricating properties of the oil ultimately lowers the life span of the hydrostatic transmission. Such a deterioration in the quality of the fluid can be rectified by oil changes at regular service intervals, but to undertake this is both costly and complicated to do, due to the nature of the construction of such transaxles.

Since the early 1960's a number of solutions have been developed for the protection of fluid in a hydraulic reservoir from such problems associated with contaminated atmospheric environments. One such solution was a pliable device called the "Fawcett Breather Bag." The Fawcett breather bag, being a permanent flexible non-porous barrier, has the physical appearance of a synthetic rubber bag fully enclosed except for a metal stem giving access to the bag interior. As stated in its brochure, the Fawcett breather bag prevents atmospheric air and its associated contaminants from contacting the fluid in the reservoir. However, the Fawcett breather bag does not solve the problem of air trapped in the space between the bag and the fluid from getting mixed into the oil as undissolved air.

An alternative solution marketed by the Swiss company Angst+Pfister does however directly address this problem. Sales brochures of that product show an assortment of different breather bags designs, some of which have overcome the problem of air entrapment in the tank including one type shown formed in the shape of a bellows mounted externally to the top of the reservoir tank. A similar design of bellows is disclosed in U.S. Pat. No. 4,987,796 which is expressly incorporated by reference herein. This particular bellows differs in that it operates in an inverted sense and is mounted internally in the fluid reservoir to one side of the housing. With such a corrugated configuration exposed to the environment, it could be prone to clogging in dirty environments once there a sufficient accumulation of airborne debris settled at the bottom of the folds which would hamper and impede its natural free movement. However, neither bellows type or for that matter the Fawcett breather bag solves the practical problem should too much fluid be inadvertently poured into the reservoir such that the expansion volume is insufficient to allow for full fluid expansion. Once pliable devices such as these have deformed to their maximum extent, any further expansion of the fluid will cause the pressure in the reservoir to rise to the point where the fluid will leak at the point of least resistance. Such leakage, quite likely to occur at the interface between the pliable device and the housing, is polluting for the environment and would especially be a problem with the pliable device shown in U.S. Pat. No. 4,987,796 as its location is below the uppermost oil surface. Gradual leakage could furthermore take place should there be any manufacturing defects or imperfections on the surface to which the pliable device is engaged.

There therefore would be an advantage to be able to take care of volume changes in the hydrostatic compartment without recourse to using an external expansion tank or reliance on an externally vented bellows apparatus.

Hydrostatic transmissions also tend to be quieter in operation and work more efficiently and effectively when the fluid within the low-pressure side of the closed-loop circuit is charged or boosted from an auxiliary pump. The addition of such an auxiliary pump increases the manufacturing cost of a hydrostatic transmission and often requires a higher power output from the engine in order to drive both the auxiliary pump and the main pump of the hydrostatic transmission. There would therefore be a further advantage if the hydrostatic circuit could be pressurized without having to include an auxiliary pump.

SUMMARY OF THE INVENTION

It is one of the objects of this invention to create a positive head on the hydrostatic fluid entering the low-pressure passage of the hydrostatic transmission without recourse to using a charge pump. Preferably the compartment containing the gear train is sealed from the environment, and rising in pressure in the gear compartment aided or induced by the expanding volume of fluid in the hydrostatic compartment produces a net increase of pressure experienced by low-pressure passage of the hydrostatic transmission.

According to a preferred embodiment of the invention, the surface level of lubricant in the gear sump is automatically adjusted in direct proportion to the operational temperature of the fluid contained within the hydrostatic chamber. Having initially a low level of lubricant in the gear sump on the one hand lessens the adverse effect of power-retarding drag losses, especially during cold weather winter operation, whereas on the other hand, a rising level of lubricant in the gear sump can ensure good lubrication even when temperatures are elevated and viscosity is low. It is therefore a still further object of the invention to enhance the operational characteristics for the hydrostatic transmission by performance matching with respect to the operation of the speed reduction assembly irrespective of the temperature conditions in the environment.

In one form thereof, the invention is embodied as a hydrostatic and gear transmission having an integrated or combined housing formation whereby the interior space provided by the housing formation can be said to divided by a deformable nonpermeable partitioning device into a region expressly used for the purpose of accommodating components comprising the hydrostatic transmission and a further region expressly used for the purpose of accommodating components of the gear transmission. The first region is completely filled with hydrostatic fluid and hermetically sealed from both the gear lubricant contained in the second region and the ambient air atmosphere environment surrounding the housing, and where any volume change in the fluid capacity of said first region due to temperature change is assimilated by the partitioning device to effect an equal but opposite volume change in said second region. The partitioning device should be pliable with the inherent characteristic of being easily elastically deformable to take up a change in the amount of hydrostatic transmission fluid in the first region, for instance, due to temperature changes of the fluid, and thereby facilitates the regulation in depth of lubricant held by the second region. Such elastic deformation of the partitioning device can occur for instance, as a result of an increase in fluid pressure above atmospheric pressure within the first region caused by the hydrostatic fluid expanding in volume and exerting a force on the partitioning device.

According to the invention in an another aspect, the housing may include an internal wall structure or bulkhead having an aperture positioned directly adjacent both the first and second regions. The partitioning device is arranged to reside juxtapose the aperture in a manner whereby to the one side of the partitioning device lies the region containing hydrostatic power transmission fluid and to the opposite side lies the lubricant for the speed reduction apparatus that may or may not also contain a mechanical differential. The hydrostatic region preferably remains full to capacity at all times with power transmission fluid whereas the region containing the speed reducing device need only be with lubricant to a certain level that does not necessarily correspond with its full capacity. In the practical operating spectrum intended for the invention, the partitioning device preferably has an initial position set at about 0° C., which corresponds to a contracted volume state of the hydrostatic fluid in the hydrostatic region and the lowest level of lubricant in the gear region, and a final position state set at about 110° C., which corresponds to the maximum expanded volume state of the hydrostatic fluid in the hydrostatic region and the highest level of lubricant in the gear region.

It is a still further preferred feature of the invention to situate the partitioning device such that its expanding and contracting motion occurs substantially along a vertical axis with respect to the ground to cause a change in the level of lubricant in the gear sump, and for fluid on the one side of the partitioning device to be in effect counterbalanced by lubricant on the opposite side.

Filling the hydrostatic chamber with power transmission fluid can be time consuming at the factory, especially as there are often air pockets remaining which are difficult to remove without first operating the hydrostatic transmission. Such air pockets are normally not a problem for hydrostatic units fitted with breathers, as such trapped air can eventually escape. However, when a hydrostatic transmission has to operate without a breather, any such trapped air, if present, will remain incarcerated inside the hydrostatic chamber and is likely to cause poor operational performance and objectionable noise. What is therefore needed is a new solution that will not only ensure that air pockets are easily eliminated at the factory but also allow the fluid level to be easily re-checked in the field. According to a preferred embodiment of the invention, the partitioning device is fastened to the housing before the hydrostatic chamber is filled with fluid. It is therefore a preferred feature of the invention to provide a fluid filling plug on the exterior of the housing enabling the hydrostatic chamber to be exposed for fluid level inspection and for the partitioning device to be correctly positioned. Correct positioning of the partitioning device can be achieved by blowing compressed air through the hole for the bung into the gear chamber before the filling plug is fastened to the housing thereby closing off the hydrostatic chamber and thereby setting the position of the partitioning device. If necessary, once the hydrostatic machine has been factory tested to ensure it functions as intended, the screw plug on the housing which closes the hydrostatic chamber can be removed to allow any remaining air that may have floated to the surface to escape to atmosphere as well as allowing the topping-up of fluid if it should be required. Compressed air can again be blown into the gear chamber to correctly re-position the partitioning device before the filling plug is tightened to seal against the housing. Even so, should subsequent checks be necessary, the fluid level can be checked by any service agent who has the correct indication depth stick and access to a compressed air appliance.

Any noticeable leakage of lubricant to the environment is unacceptable and according to the preferred embodiment of the invention, any slight leakage of fluid from the hydrostatic chamber, for instance due to a manufacturing defect at interface between the housing and the partitioning device or initial overfilling of the chamber, can be captured internally. Therefore, according to the invention in another aspect, a leakage capturing system in the form of the gear train compartment is provided for the collection of unintentional discharges of fluid from the hydrostatic compartment.

BRIEF DESCRIPTION OF THE DRAWINGS

The above mentioned and other novel features and objects of the invention, and the manner of attaining them, may be performed in various ways and will now be described by way of examples with reference to the accompanying drawings, in which.

DETAILED DESCRIPTION OF PREFERRED EMBODIMENTS

Figure 1:
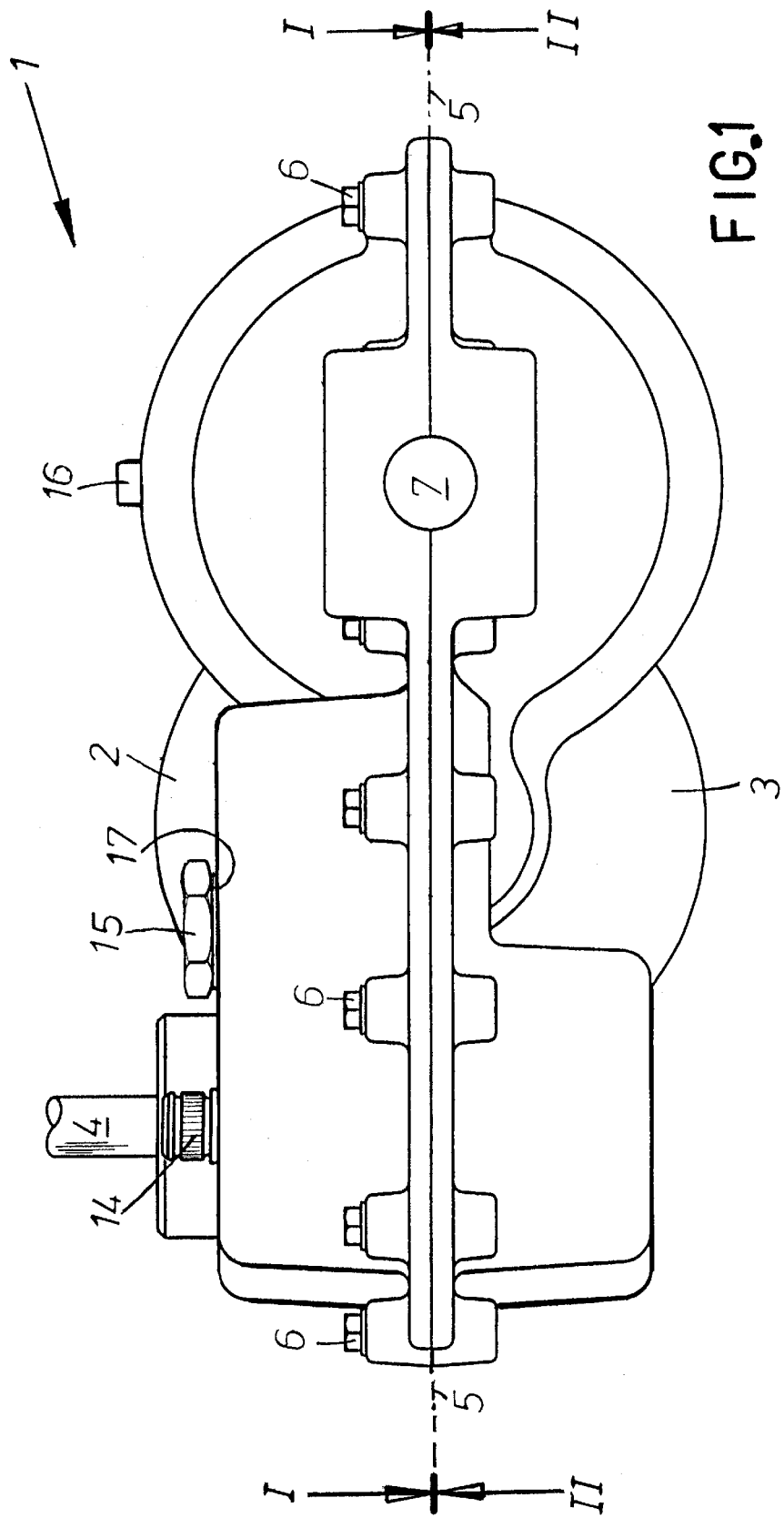
FIG. 1 is an external side view from one side of an embodiment of a hydrostatic transaxle according to the invention.

For the embodiment of the invention depicted by FIGS. 1 to 5, the hydrostatic and gear transmission is in the form of a hydrostatic transaxle designated by the numeral 1 and has by way of example a housing structure comprising an upper cover housing element 2 joined to a lower case housing element 3 along parting-plane 5. An input drive-shaft 4 is included which is rotatably supported in the housing structure as is shown protruding from the upper cover housing element 2. Parting-plane 5 is here shown coincident with the axis for the output axle shafts 7, 8, but could also be positioned offset to one side of the shafts 7, 8 axis in a parallel but not coincident relationship. Alternatively, the structure of the housing may also for instance have the parting-plane arranged in a manner whereby it is situated perpendicular with respect to the axis of the axle shafts. Regardless of where the parting-plane lies, for purposes of filling the hydrostatic transaxle with hydrostatic power transmission fluid as well as lubricant for the mechanical transmission, plug 15 and bung 16 are provided, both preferably at or near the top of the housing as shown in FIG. 1.

Figure 2:
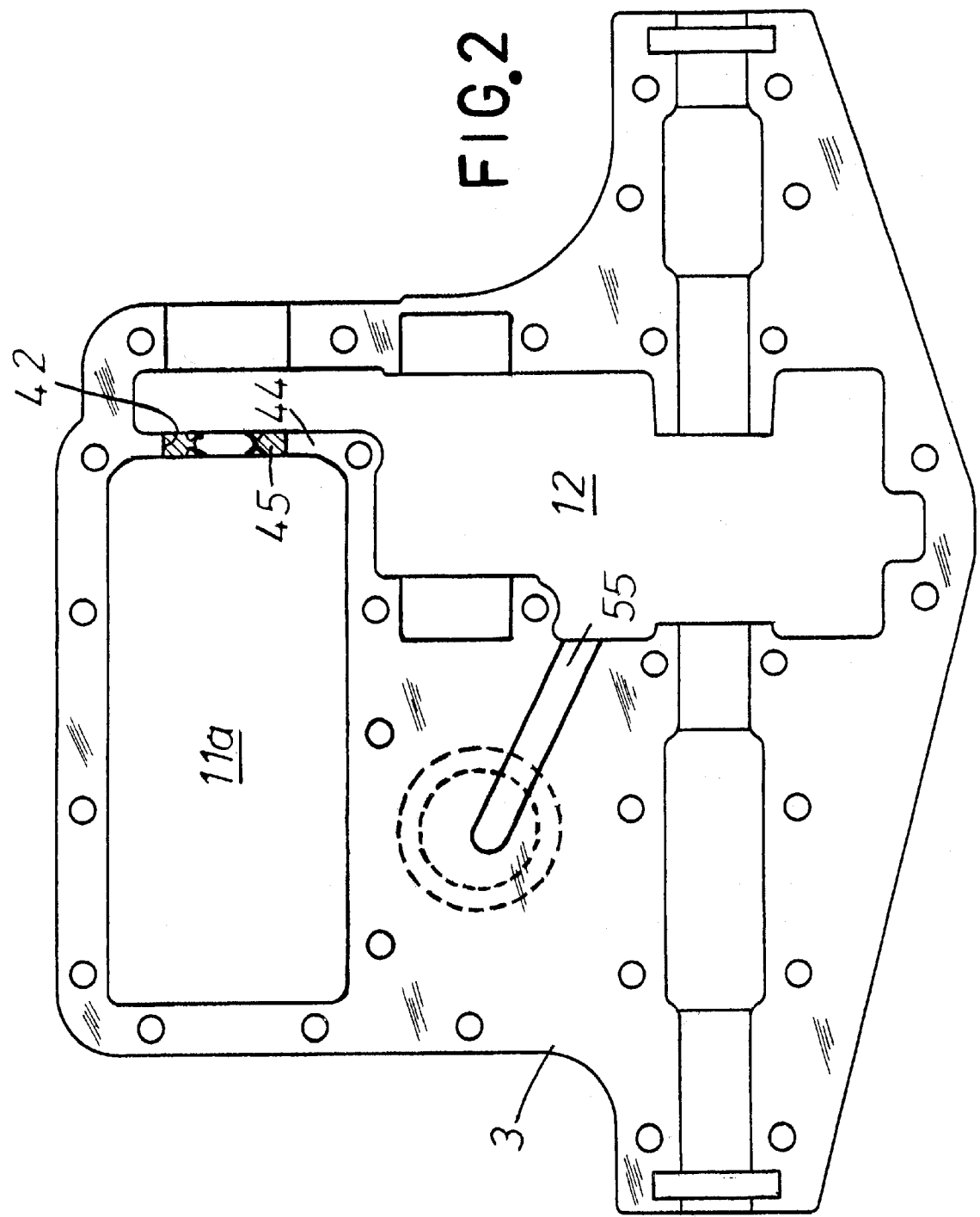
FIG. 2 is a plan view along the section line I—I in FIG. 1 to show the interior of the lower case housing element and a shaft seal element.
Figure 3:
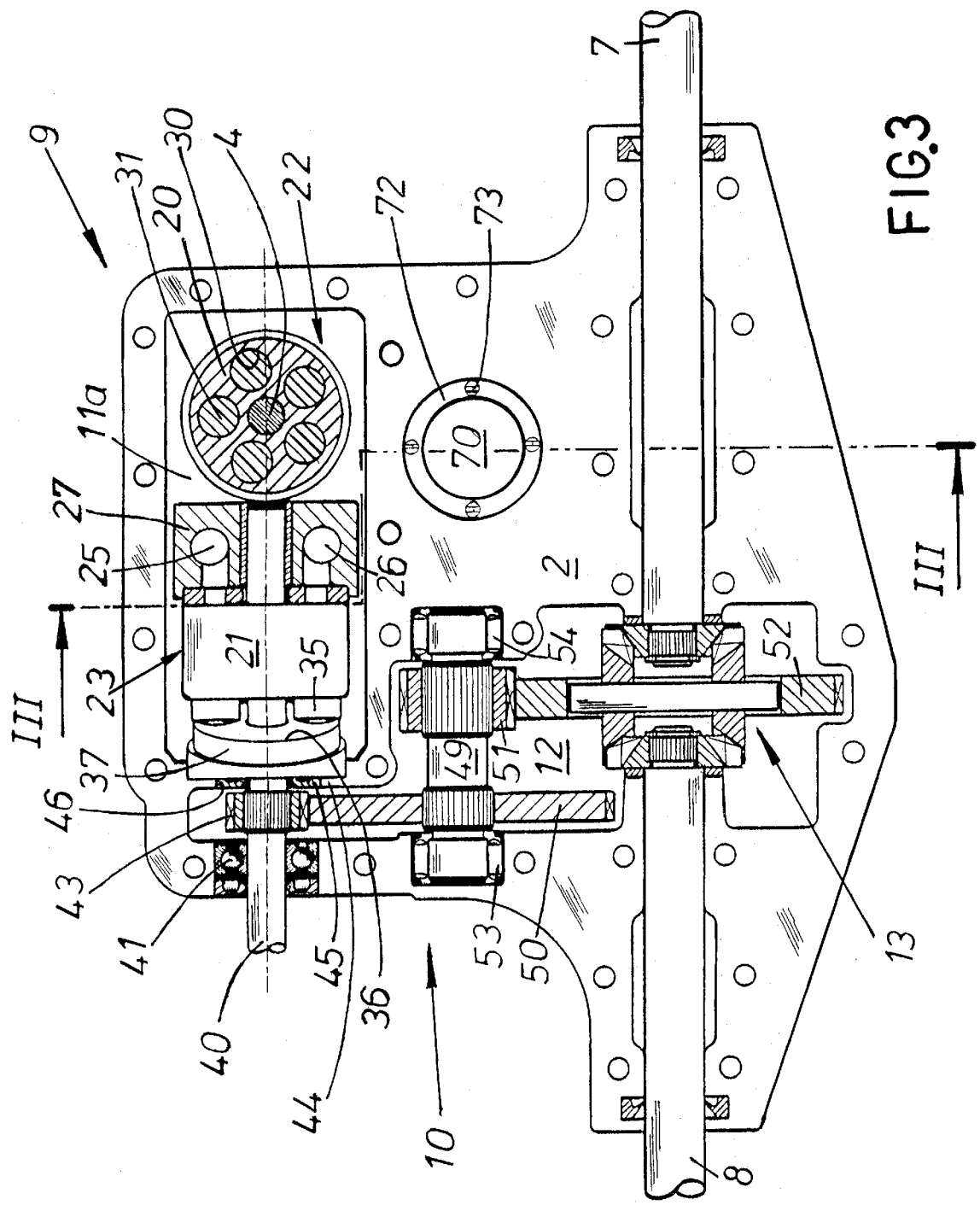
FIG. 3 is a plan view of the hydrostatic transaxle of FIG. 1 along the section line II—II.

FIG. 3 shows the interior of upper housing element 2 with all internal elements comprising the hydrostatic and gear transmission positioned in place, and FIG. 2 shows the interior of lower housing element 3. A gasket seal or preferably a liquid gasket sealant is applied to cover those engaging surfaces in the housing so to produce a sealingly tight contact once housing elements 2, 3 are joined, and where a plurality of bolts or screws 6 are used to secure the housing elements 2, 3 together. The housing elements 2, 3 when thus combined together provide an interior space as best seen in FIG. 3 as distinct regions marked as 11a and 12, and where region 11a is the hydrostatic chamber and contains only hydrostatic power transmission fluid whereas region 12 is the gear chamber and contains only gear lubricant. Region 11a therefore houses the hydrostatic transmission depicted by arrow 9, whereas speed reducing gearing 10, and, when needed, a mechanical differential 13, reside in region 12.

Figure 4:
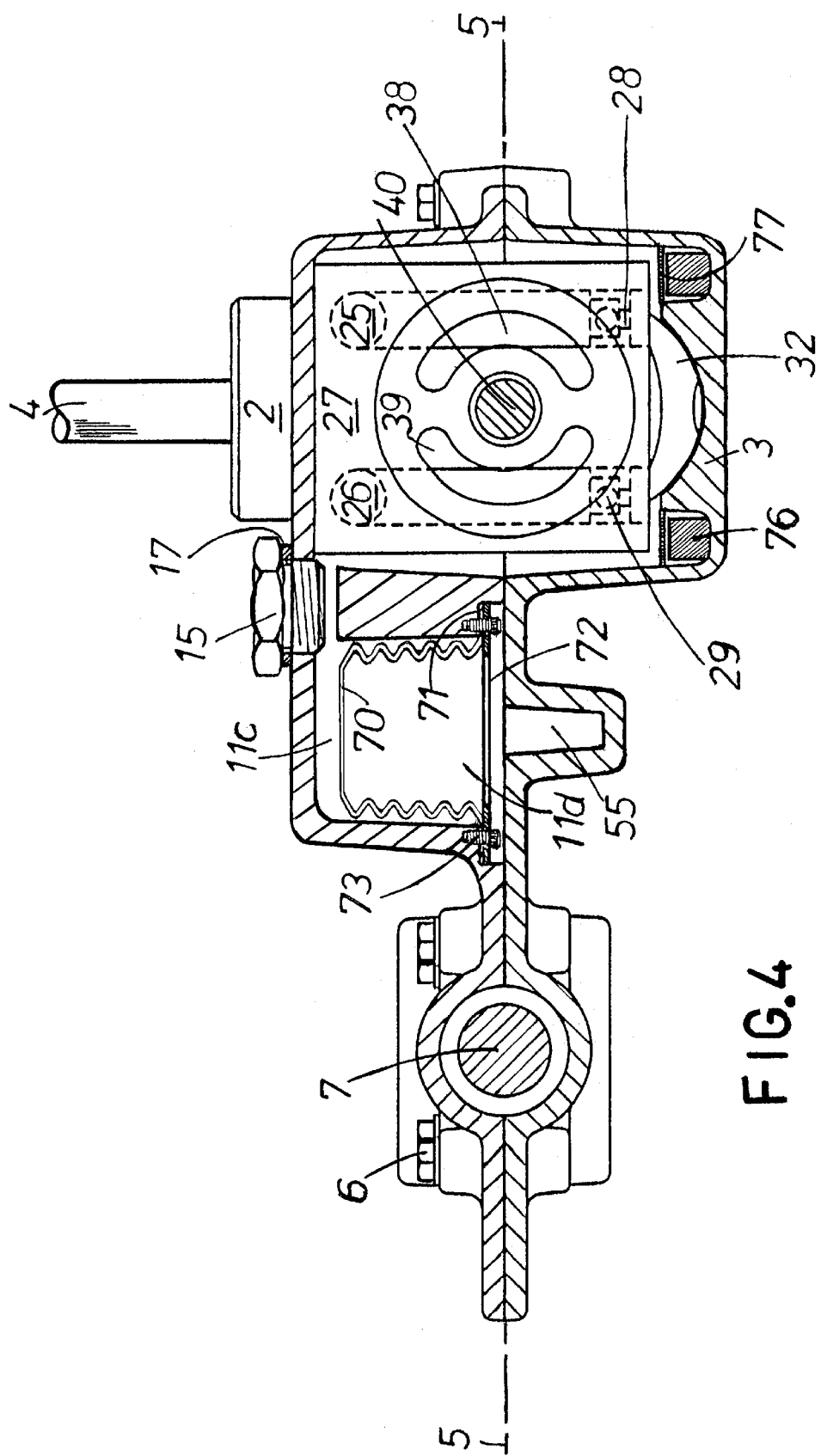
FIG. 4 is a further sectioned view of the hydrostatic transaxle on line III—III of FIG. 3.
Figure 5:
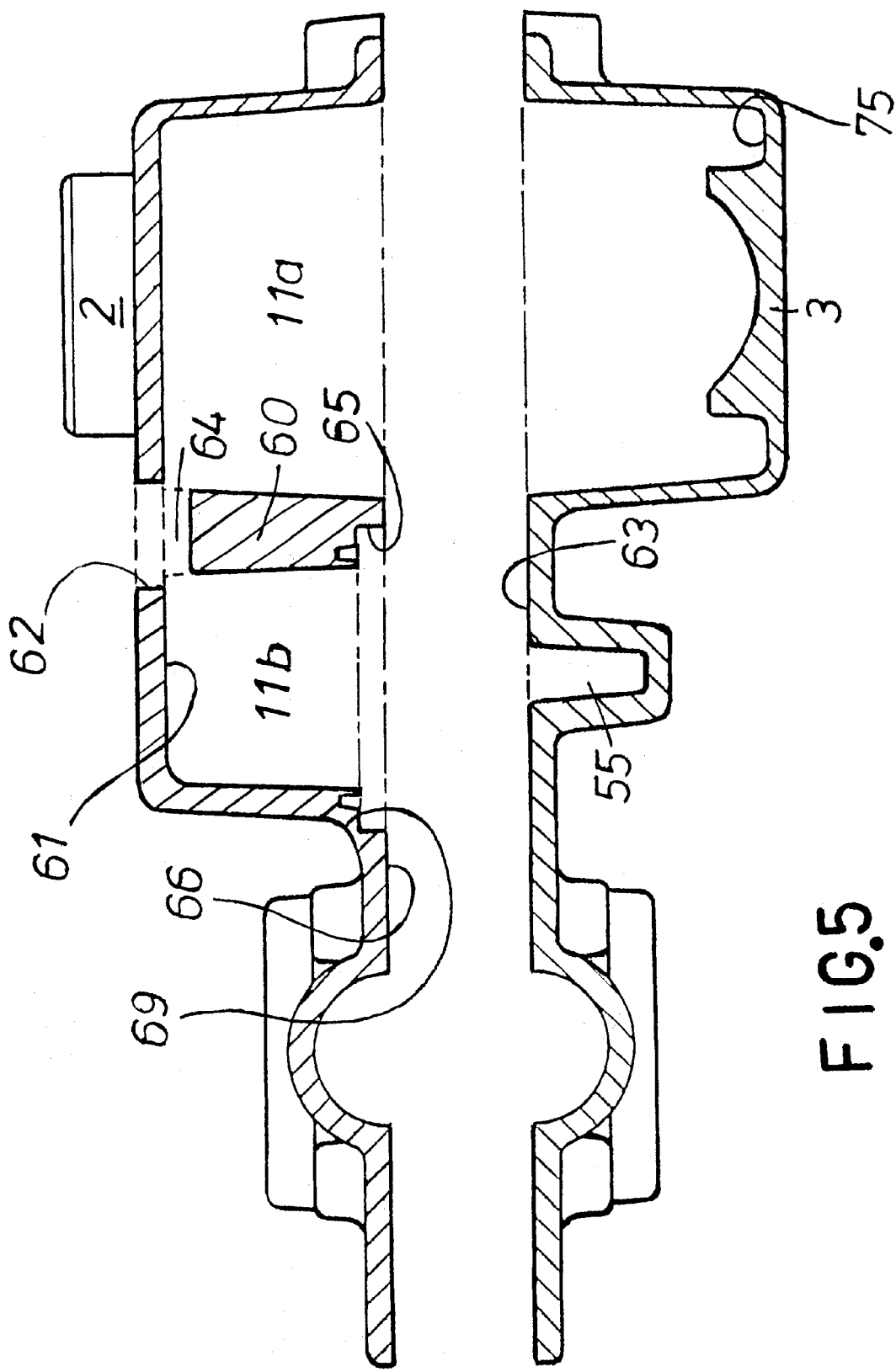
FIG. 5 is a sectional view of the housing elements of FIG. 4 with the internal elements for the hydrostatic and gear transmission removed.

Comparing FIGS. 4 & 5, it will however become immediately apparent that prior to assembly of the internal elements into the housing, the initially empty housing elements as shown in FIG. 5 would appear to allow region a to communicate with region 12. Such communication is present as corridor passage 64 in the upper housing element 2 which allows the connection of region 11a to a further region here called the "mutual region 11b", whereas for the lower housing element 3 best seen in FIGS. 2 & 5, region 12 is connected by channel 55 to mutual region 11b. Were the hydrostatic and gear transmission element to be installed in such a housing framework, then a flow of fluid and lubricant would occur in either direction between regions 11a, 12. However, according to an important feature of the present invention, mutual region 11b of FIG. 5 becomes partitioned in a manner whereby hydrostatic fluid as well as gear lubricant can reside side by side in region 11b without contacting one another. In effect, the partitioning device of this invention can be said to segregate hydrostatic fluid on the one side and hydrostatic power transmission fluid on the opposite side in mutual region 11b while still allowing expansion and contraction in volumes to occur between the two regions 11a, 12. Needless to point out, the lubricant on opposite sides of the partitioning device may be the same material, although as explained above there are certain advantages in using different lubricants each suited to its particular environment.

Also, as a point of lexicon, although the present specification and claims speak of adjacent gear and hydrostatic chambers, and although the invention certainly embraces embodiments in which such chambers are immediately adjacent, FIGS. 4 and 5 illustrate that other embodiments of the invention might also be considered to comprise a third intermediate chamber (the region 11b) accommodating the partitioning and expansion device.

Once assembly of the hydrostatic transaxle is complete, region 11a can be filled with power transmission fluid until full, before plug 15 is tightened down on compression seal washer 17 to produce a pressure tight seal on the upper housing element 2. Similarly, once region 12 has been filled with sufficient lubricant, a simple rubber bung is employed to seal off region 12.

Hydrostatic transmission 9 is comprised of at least one hydraulic pump fluidly coupled to at least one hydraulic motor, and where respective cylinder-barrels shown as 20, 21 of the hydrostatic-transmission pump 22 and motor 23 are mounted perpendicular to one another such that the rotating axis of the pump cylinder-barrel 20 is vertical and arranged parallel and co-axial with respect to the input-drive shaft 4 to which it is fixed for rotation whereas the rotating axis of the motor cylinder-barrel 21 is parallel with respect to the rotating axis of the axle-shafts 7, 8. A control-shaft 14, in this embodiment shown located in the upper cover housing element 2, allows the operator to effect changes in the displacement of the hydrostatic transmission 9 for the purpose of controlling the speed of the vehicle. Fluid passages 25, 26 are provided in a fluid distributor member 27 which act to fluidly couple the pump 22 to the motor 23 as is well known in the art and commonly referred to as a closed loop fluid circuit. A respective check-valve 28, 29 is included for each passage 25, 26 to allow the admittance of make-up fluid into passages 25, 26 from region 11a in order that the hydrostatic transmission 9 can recover any fluid loss during operation because of high-pressure leakage.

The cylinder-barrel 20 of the pump 22 is provided with a plurality of axial cylinder-bores 30, each bore 30 containing a respective piston 31 and where each piston 31 is being axially urged outwards by a spring (not shown) located behind the piston 31 in the bore 30 to engage a swash-plate 32. Each cylinder-bore 30 is arranged to communicate in sequence with a pair of arcuate-shaped ports (although not visible they are generally the same as those arcuate-shaped ports 38, 39 shown for the motor 23 in FIG. 4) on the fluid distributor member 27 that connect with respective passages 25, 26. The cylinder-barrel 21 of the motor 23 is almost in all respects identical to that of the pump, and carries with it a series of axially sliding pistons 35 which are operatively connected to the operational surface 36 of an inclined thrust plate 37. FIG. 4 shows the pair of arcuate-shapes ports 38, 39 used for transferring fluid from passages 25, 26 to the cylinder-barrel 21 of the motor 23. Cylinder-barrel 21 is fixedly attached to drive shaft 40 and because of the piston 35 reaction on inclined thrust plate 37, an angular driving moment is created on the cylinder-barrel 21 which is then caused to revolve.

As drive shaft 40 must pass from hydrostatic region 11a to gear region 12 in order to transfer power from the hydraulic motor 23 to the gear train 10, best seen in FIG. 2, semi-circular opening 42 is provided in internal bulkhead wall 44 of housing element 3 (and a matching opening 46 is provided in the opposite bulkhead of housing element 2 as shown in FIG. 3) for the purpose of supporting a shaft seal 45. Without such a shaft seal 45, regions 11a, 12 would in effect be in fluid communication. Therefore to better illustrate this point, the interior view of lower housing element 3 in FIG. 2 has the addition of shaft seal 45 positioned in that portion of the bulkhead wall 44 that exists in this particular housing element.

When the hydrostatic compartment region 11a is to operate under pressurized conditions, it is preferable that good quality shaft seals are to be used such as the well known types manufactured by the company Freudenberg. Similarly, the gear region under such conditions should also preferably be fitted with good quality seals over shafts protruding out from the region 12 such as, for example, axle shafts 7, 8. Although as shown, shaft seal 45 is preferably of the double-lip type, single lip seals may also be employed depending on pressure conditions present within regions 11a, 12.

Drive shaft 40 supported in the housing by at least one bearing 41 passes through seal 45 so that the motor 23 of the hydrostatic transmission 9 can be connected to the first speed reducing gear 43 of the gear train 10.

Rotation of gear 43 is transmitted by further gears 50, 51, 52 to the internal gears of the differential 13 assembly and finally to axle shafts 7,8. The inclusion of a differential assembly is important as it allows normal differentiation between the left and right drive wheels of the vehicle and helps prevent lawn damage especially when tight turns are undertaken. However, there are applications where no such differentialled action is required, and, in these instances, a single axle shaft may be used instead of the two as shown in this embodiment. In the case of a single axle shaft, this shaft can be arranged to extend outwardly on one or both sides from the housing.

Although this embodiment uses a simple rubber bung 16 to shut off region 12, a threaded plug could also be used instead if so desired, which would be tightened in similar fashion to plug 15 to compress a bonded sealing washer on the housing. Although it is a preferable but not an essential feature of the invention that region 12 should be pressurized, for non-pressurized applications, a breather could be used in place of bung 16. Such a breather could be for instance, of the type having an internal sintered filter which would prevent larger sized particles of solid matter from entering region 12, or alternatively, be just a small vent somewhere at the top of the housing above region 12 so that region 12 would be atmospherically aspirated. It would also be possible to include a restrictor or even a one-way air valve in place of bung 12 where the restrictor would also allow region 12 to become slightly pressurized during machine operation.

Region 11a for the hydrostatic power transmitting device is preferably filled to capacity with power transmission fluid and remains completely full at all times. In contrast and provided that no reliance is being placed on using an external expansion tank, it is most beneficial that region 12 for the speed reducing apparatus be only partially filled with gear lubricant. With region 12 only partially full with lubricant when cold, there is thereby provided an additional volume space within the housing to not only take care of the expansion of the gear lubricant itself but also, as will be explained later, the unavoidable expansion in volume that will occur as the temperature of the power transmission fluid in region 11a increases.

The surface level of lubricant within region 12 has not been shown in the drawings as it is variable depending on temperature, but it would be preferable for the level of lubricant to be sufficiently high to keep essential elements such as shaft 49 and the shaft bearings 53, 54 well lubricated even when the unit is stone cold. Preferably, channel 55 remains flooded at all times.

As best seen in FIGS. 4 & 5, upper cover housing element 2 has been constructed to include an integral bulkhead wall 60 that projects downwards from the upper interior surface of the horizontal exterior wall marked 61 in a direction towards the parting-plane 5 to join surface 63 on the lower case housing element 3. Wall 61 is punctured at one location by machined hole 62 which is then threaded to accept fluid filling plug 15, and this machining operation by removing a section of the bulkhead wall 60 thereby provides the corridor passage 64 which communicates region 11a to the neighboring mutual region 11b.

By way of example, with this housing package comprising housing elements 2, 3, a number of interior and external walls such as 44, 60 and 61 are provided which form a structural boundary surrounding the hydrostatic region 11a as well as the mutual region 11b and which would remain intact or complete were it not for the inclusion of an internally disposed opening 65 as shown in FIG. 5. Opening 65 intersects the underside surface 66 of the upper housing element 2 and thereby communicates mutual region 11b with channel 55.

The invention as here described preferably includes such an opening 65 in at least one of the interior wall bulkheads 60 in order that partitioning device 70 can be positioned over opening 65 before the housing elements 2, 3 are joined together during the assembly stage of machine building. With partitioning device 70 in place in mutual region 11b as shown in FIG. 4, it acts in dividing mutual region 11b into an upper pocket void 11c and a lower pocket void 11d.

As pocket void 11c is connected by corridor passage 64 to region 11a, it is also full of hydrostatic fluid, whereas only gear lubricant in region 12 is able to flow into pocket void 11d via channel 55. Regardless of the type or design of housing package chosen to surround the hydrostatic transmission and the gear transmission, the interior space provided for the transmission elements by being divided by the partitioning device 70 as an integral part of the interior housing structure creates independent respective regions for the hydrostatic and gear transmission as mentioned earlier.

The hydrostatic region and the gear region are kept apart by the partitioning device 70 which as a non-porous barrier, performs to segregate the regions such that gear lubricant in contact on the one side is prevented from mixing with the hydrostatic fluid on the opposite side. Partitioning device 70 should exhibit the required degree of flexibility needed and may be fabricated in a variety of alternative shapes to suit the preference of the manufacturer, and may for instance be of bellows; bladder; diaphragm, or breather bag like construction. Whereas on the one hand the partitioning device 70 must have a pliable and deformable disposition, its affiliated static housing structure on the other hand must remain solid. To contrast with the interior walls or bulkheads, the partitioning device 70 could be said to be a deformable portion of the internal bulkhead.

Although less preferred at present, it is also possible that partitioning device 70 may be formed in whole or in part of porous material, or may include a porous element in the nature of a permeable membrane, to permit controlled passage of lubricating fluid between the hydrostatic transmission and gearing chambers. The passage of fluid through such a porous element should not prevent the partitioning element 70 from deforming in response to expansion of oil in the hydro chamber, and could serve as a pressure relief valve to prevent damage to the partitioning member when it has deformed to its maximum extent.

It is purposely arranged that where partitioning device 70 does come into non-moving contact with the static and therefore nondeforming housing structure of the machine wall (for instance bulkheads 44, 60), it occurs at its flange-like circular lip 71 which is arranged to engage recessed seat 69 provided in housing element 2. A hollow disc 72 is then placed over the lip 71 and once screws 73 have been sufficiently tightened, lip 71 is slightly deformed on recess 69 thereby isolating region 11a, 11b from region 12. Once partitioning device 70 has been fixed in this manner to housing element 2, assembly of the machine can continue and housing elements 2, 3 can subsequently be joined together and fastened by screws 6.

From the point of contact at recess 69, partitioning device 70 is shown to be in a fully extended condition which corresponds to the volume of fluid within chamber 11a, corridor passage 64, and pocket void 11c being at a minimum value (i.e. when the fluid is cold). Although it is preferable but not essential for partitioning device 70 be provided with an inherent ability to deform on its own accord to comply as required to changes in volume in the respective regions, a tensioning member could be included to bias partitioning device 70 in one direction, for this embodiment in a direction towards its retracted state. As shown in FIG. 4, pocket void 11d on the underside of partitioning device 70 is at its greatest value and contains gear lubricant. However, as soon as the hydrostatic power transmitting device 9 is operated, the power transmitting fluid begins to warms up and there is a corresponding increase in the volume of hydrostatic fluid in 11a, 64, 11c. The hydrostatic fluid in contact with partitioning device 70 begins to exert a force against partitioning device 70 causing it to retract in a direction towards recess 69, and there a corresponding decrease in the size of pocket void 11d resulting in a displacement of gear lubricant to region 12 via channel 55. The size of pocket void 11d will continue to decrease until such time that steady state conditions have been reached. As pocket void 11d may then only contain the bare minimum of gear lubricant, the volume having been displaced and induced a rise in level of lubricant surrounding the gearing can ensure the fall in viscosity due to elevated temperature operation is less serious than would otherwise be the case. Thus, this invention can provide auto-levelling in the surface level of gear lubricant within the second region irrespective of the pressure conditions within the second region.

Once the unit begins to cool down and the size of pocket void lid begins to increase, lubricant flows in the reverse direction through channel 55 and there is a decrease in depth of lubricant bathing the gears. As the lubricant for the gear train remains correspondingly low in level when the unit is cold, power losses are minimized during start-up and for general winter operation. It is therefore a feature of this embodiment that lubricant for the gears can flow in either direction along channel 55 depending whether the temperature conditions experienced by the machine are rising or falling. When region 12 experiences positive or above atmospheric pressure, it will also influence the magnitude of the positive head of the hydrostatic power transmission fluid to such an extent that not only do the check-valves 28, 29 operate more efficiently in replenishing lost fluid from the closed-loop circuit passages 25, 36, but also the hydrostatic transmission operates with less noise.

Although as described both hydrostatic region 11a as well as gear region 12 are internally pressurized, it is nevertheless not intended to limit the invention in this way. For instance, region 12 could be pressurized by an inert gas such as nitrogen at the factory once the fluid and lubricant has been poured into the respective regions.

In the event that the unit contains a slight imperfection, for instance a barely visible scratch on the surface of recess 69 which interfaces with the lip 71 of partitioning device 70, the very small amount of fluid lost during the life span of the machine by such leakage from region 11a would be captured by region 12 which acts in this respect as a safety receiver.

Although the type of lubricant used for lubricating the gear train can be grease, the invention performs better when a gear oil is used as it is likely to react more rapidly to temperature changes in the machine. Furthermore, gear oil would have the additional advantage of being able to more readily wash away any debris that may on occasion lodge itself on the surface of the partitioning device 70. It is therefore preferable but by no means essential to arrange that partitioning device 70 moves in a vertical rather than a horizontal fashion, as well if possible, in as close a location as possible to the filling plug 15. Some of the advantages in including a partitioning device 70 as described are:

a) Ease of filling hydrostatic region 11a, 11b with fluid (the nature springiness and pliability of partitioning device 70 will mean it can set its own correct initial position when filled with cold oil at the factory assembly stage unlike earlier known devices);

b) Ease of removing any trapped air after assembly;

c) Simple check for inspection for the correct height setting of the partitioning device 70 by insertion of depth probe through hole 62 while using compressed air through breather vent 16 for vertical adjustment;

d) Ease of maintenance in the topping up of fluid in hydrostatic region 11a, 11b by a service agent;

Once all has been checked to be satisfactory, filling plug 15 is placed into threaded hole 62 is and tightened down to compress the bonded seal washer 17 so to shut off region 11a, 11c from the outer environment.

A ring or horseshoe magnetic 76 disposed in recess 75 provided at the bottom of housing element 3 as shown in FIG. 4 has been included to attract any ferrous particles of contamination that might be otherwise suspended in the hydrostatic fluid. A gauze 77 located above magnet 76 prevents fluid motion within region 11a from disturbing any contamination that might have settled in recess 75.

A second embodiment differs in two main respects from the first embodiment, and the following description is directed principally to the main points of difference. Furthermore, as most internal components remain substantially similar to those already described for the first embodiment, for convenience sake, many that are here numbered carry the same reference numerals as have been designated in the first embodiment.

Figure 6:
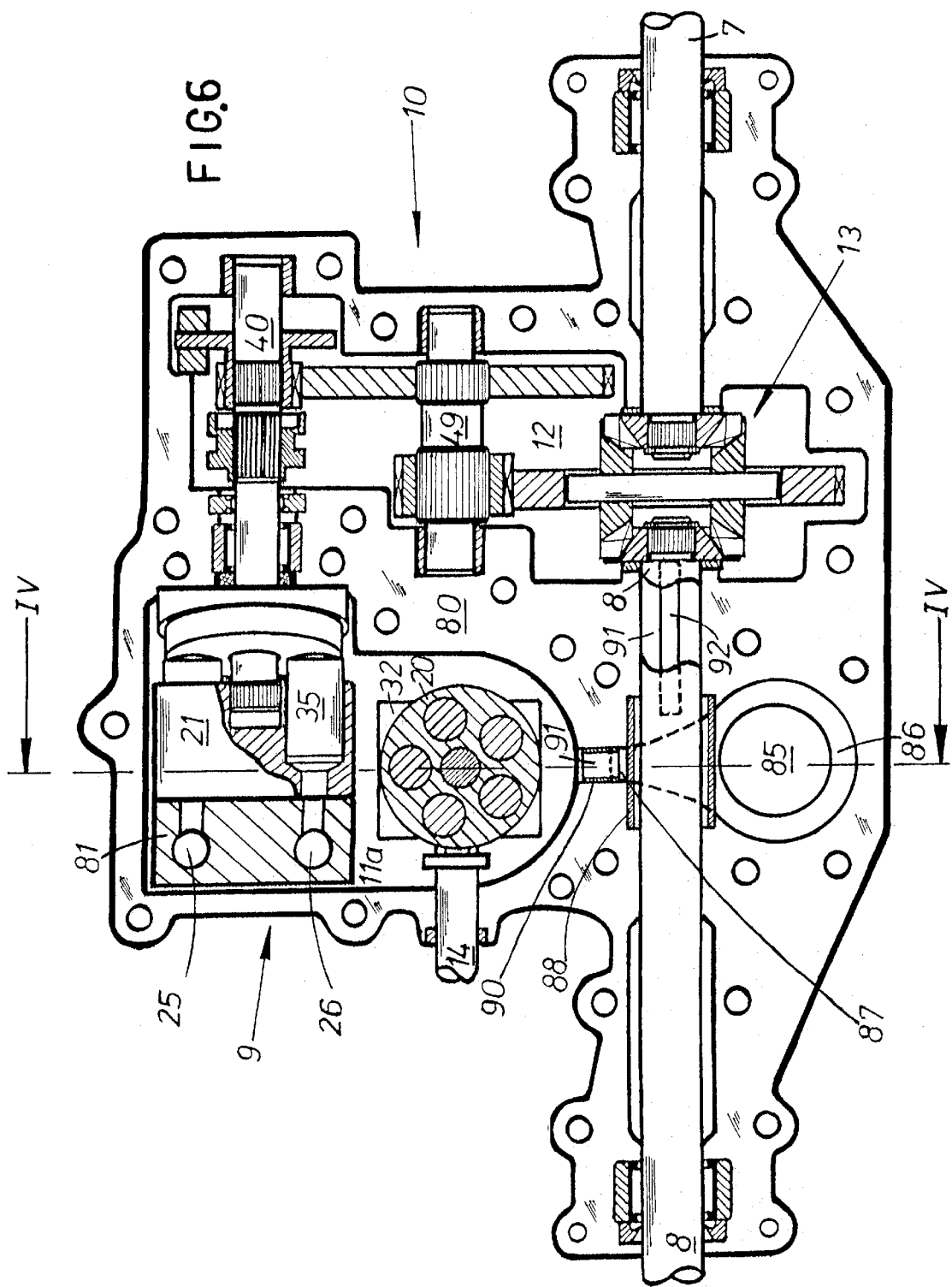
FIG. 6 is a further embodiment of the invention disclosing an alternative type of partitioning device.
Figure 7:
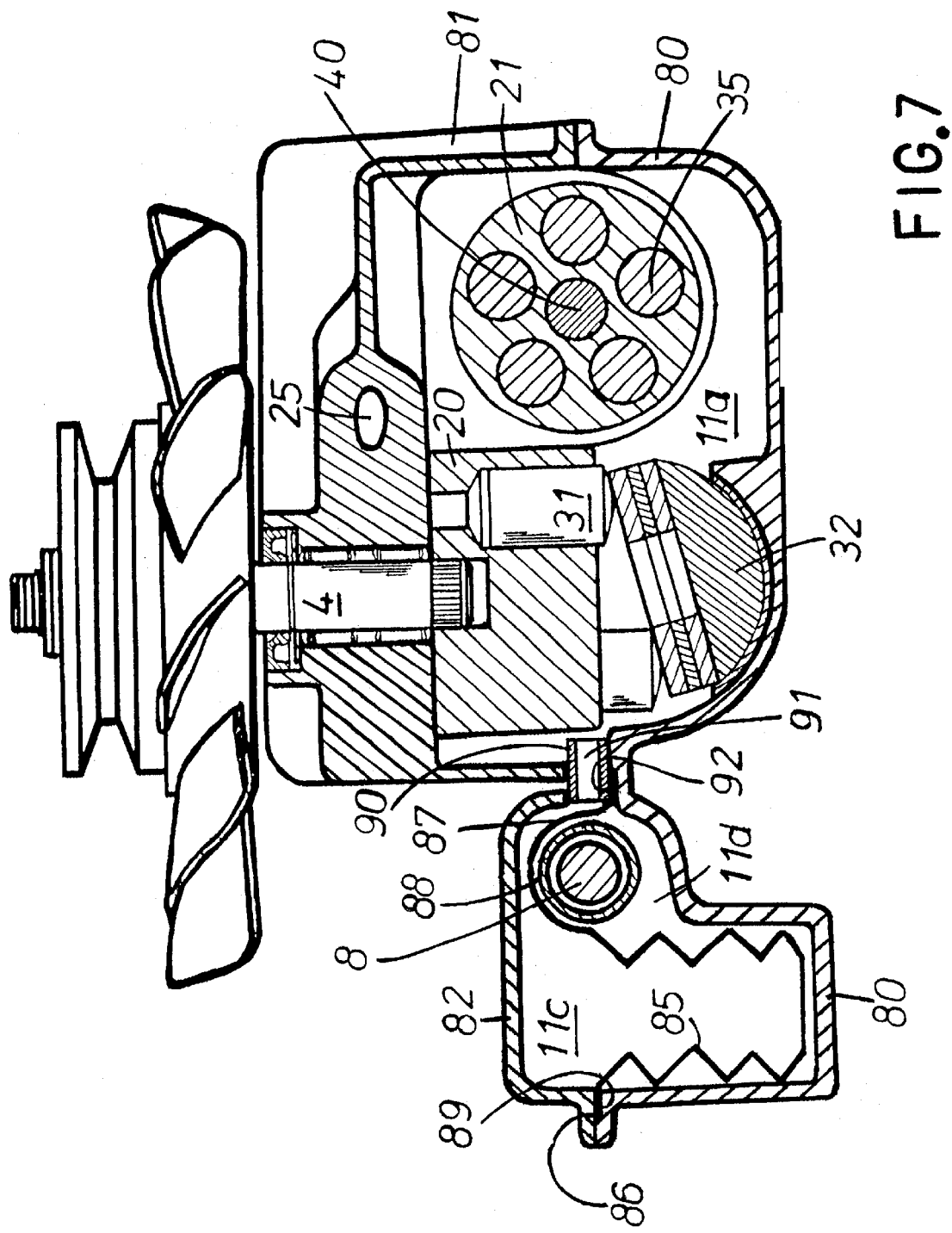
FIG. 7 is a part-sectional view on line IV—IV of FIG. 6.

As shown in FIGS. 6 & 7, the housing structure surrounding the components of the hydrostatic power transmitting device 9 comprises housing elements 80, 81 whereas housing elements 80, 82 surround the speed reducing apparatus that may be in the form of a gear train 10 and additional mechanical differential unit 13. Although as shown, lower housing element 80 is both common to the hydrostatic transmission 9 as well as the differential gear train 9, 10, it could be modified to two separate housing elements if so desired. Similarly, upper housing elements 81, 82 could be combined into a single housing element. Fluid passages 25, 26 connecting the pump 22 to the motor 23 are formed integrally in housing element 81.

The partitioning device denoted for this embodiment by reference numeral 85 allows the housing structure to be divided into a hydrostatic region 11a, 11c and a gear region 12, 11d. In this embodiment, partitioning device 85 resides closer to axle shaft 8 to one side of the differential unit 13. As best seen in FIG. 7, partitioning device 85 has an inverted orientation in contrast with the first embodiment, and is provided with a flanged lip 86 which is circular except for being radially extended to one side as denoted by reference numeral 87, and from where it extends radially to curl over a large tube 88 which protects it from contacting revolving axle shaft 8 to enter recess 89 provided in housing element 80 to hook under small tube 90. Once all components of the hydrostatic power transmitting device 9 and speed reducing apparatus 10 have been assembled into place, the upper two housing elements 81, 82 can be lowered and attached to common housing element 80 and where they engage small tube 90 to compress and deform partitioning device 85 at this location. Elsewhere, over its remaining circumferential length, flanged lip 86 is trapped between housing elements 80, 82 so eliminating the hollow disc as is used for the first embodiment.

Small tube 90 connects chamber 11a to pocket void 11c whereas longitudinal groove 92 etched on the axle shaft bearing surface 91 of the lower housing element 80, connects pocket void 11d to chamber 12. Hydrostatic power transmission fluid within region 11a is thereby able flow freely in either direction through small tube 90 into variable-volume pocket void 11c depending on operating temperature of the machine, whereas longitudinal groove 92, taking the place of the channel used in the first embodiment, allows the free flow of lubricant in both directions between gear region 12 and variable-volume pocket void 11d.

FIG. 7 shows partitioning device 85 being in its fully expanded condition which corresponds to when the volume of hydrostatic fluid within region 11a is at a maximum when the machine is operated at an elevated temperature. Once cooling occurs, hydrostatic fluid and gear lubricant is contracted and the inverted partitioning device 85 moves upwards drawing in through groove 92 lubricant from region 12 to enter at its underside pocket void 11d.

In such examples of pressurized or semi-pressurized gear sumps as described, the partitioning member may alternatively be positioned in a horizontal fashion rather than vertical, preferably but not essentially arranged to remain below the surface of the lubricant at all times.

Although not shown in these embodiments, an air trap can be included at the top of the hydrostatic region in the housing so that any air not expelled during unit fill-up at the factory can become lodged in the trap.

For certain applications, it may be desirable for the machine to operate with region 12 full to capacity with lubricant. It should therefore be noted that this invention may be modified, for example, by including an external expansion tank which would be connected by a pipe to region 12, and where the aforementioned rubber bung 16 would be discarded and replaced by such a piped connection. The external expansion tank could be atmospherically vented or for that matter encased to become pressurized with or without reliance on being charged by an inert gas such as nitrogen. Even so, for many applications, the addition of such an external expansion tank would be impractical as little space exists under the frame of a vehicle for such a tank to be located, and that therefore, it is preferable although not essential to confine all natural variations in fluid volume to within region 12.

In the case of separately located hydrostatic and gear reduction transmissions or for that matter units that are not connected together by a common housing, the partitioning device, being disposed in the gear transmission chamber, can be fluidly connected to the hydrostatic chamber by means of a pipe. With the hydrostatic chamber and well as the volume contained in the pipe full of fluid in contact with one side of the partitioning device, an increased volume of fluid in the hydrostatic chamber due to temperature rise forces the partitioning device to displace an equal volume of lubricant in the gear chamber. Alternatively, the partitioning device could be disposed in the tube that serves as the communication passage between the hydrostatic and gear transmissions.

Although neither of these two embodiments have showing an oil filter for the hydrostatic transmission, a filter strainer may be usefully deployed if so desired, to filter the make-up fluid entering the check valves members. Furthermore, although an axial piston hydrostatic machine has been described, this invention is also applicable to any type or form of hydrostatic power transmitting machine as well as for that matter, other forms or types of speed reduction apparatus.

In accordance with the patent statutes, I have described the principles of construction and operation of my invention, and while I have endeavored to set forth the best embodiments thereof, I desire to have it understood that obvious changes may be made within the scope of the following claims without departing from the spirit of our invention.

I claim:

1. A hydrostatic and gear transmission having a housing formation with an interior space divided into a hermetically sealed first region into which hydrostatic transmission components are disposed and a second region into which gear transmission components are accommodated by a deformable non-permeable partitioning device; and where said first region contains hydrostatic fluid whereas said second region contains gear lubricant; and wherein any volume change in the fluid capacity of said first region due to temperature change is assimilated by said partitioning device to effect an equal but opposite volume change in said second region.

2. A hydrostatic and gear transmission according to claim 1 wherein said hydrostatic transmission components include a fluid power circuit fitted with at least one check-valve for allowing said circuit to recover leakage losses; and where an increase in volume change of said hydrostatic fluid in said first region by inducing deflection of said partitioning device causes a reactive pressure in said first region to promote an assisted take up of make-up fluid by said at least one check-valve.

3. A hydrostatic and gear transmission according to claim 2 wherein said second region is hermetically sealed from the exterior of said housing to perform as a pressure vessel when required for opposing the otherwise free deflection of said partitioning device and thereby promoting a further increase in the magnitude of said reactive pressure in said first region.

4. A hydrostatic and gear transmission according to claim 2 wherein said second region is atmospherically vented to the ambient air environment.

5. A hydrostatic and gear transmission according to claim 1 wherein said hydrostatic transmission components include a fluid power circuit fitted with at least one check-valve for allowing said circuit to recover leakage losses; and where an increase in volume change of said hydrostatic fluid in said first region by inducing deflection of said partitioning device causes a positive head in the pressure of said hydrostatic fluid in said first region to promote an assisted take up of make-up fluid by said at least one checkvalve.

6. A hydrostatic and gear transmission according to claim 1 wherein said second region is hermetically sealed from the exterior of said housing to become pneumatically pressurized to a level above ambient atmospheric air pressure; said hydrostatic transmission components include a fluid power circuit fitted with at least one check-valve for allowing said circuit to recover leakage losses; and where said pneumatically pressurized said second region in opposing the otherwise free deflection of said partitioning device promotes an assisted take up of make-up fluid by said at least one checkvalve.

7. A hydrostatic and gear transmission according to claim 1 wherein said second region is hermetically sealed from the exterior of said housing for inert gas pressurization to a level above ambient atmospheric air pressure; said hydrostatic transmission components include a fluid power circuit fitted with at least one check-valve for allowing said circuit to recover leakage losses; and where said inert gas pressurization of said second region in opposing the otherwise free deflection of said partitioning device promotes an assisted take up of make-up fluid by said at least one check-valve.

8. A hydrostatic and gear transmission according to claim 1 wherein said partitioning device translates expanding fluid motion within said first region into rising linear motion of lubricant within said second region.

9. A hydrostatic and gear transmission according to claim 1 wherein said partitioning device translates contracting fluid motion within said first region into lowering linear motion of lubricant within said second region.

10. A hydrostatic and gear transmission according to claim 1 wherein an expanding volume of said hydrostatic fluid within said first region causes deflection of said partitioning device effecting a displacement of said gear lubricant within said second region.

11. A hydrostatic and gear transmission according to claim 6 wherein responsive to changes in volume of said hydrostatic fluid within said first region, the surface level of said gear lubricant in said second region is altered for an improved power operating efficiency of said hydrostatic and gear transmission.

12. A hydrostatic and gear transmission according to claim 11 wherein auto-levelling of said surface level of said gear lubricant occurs in said second region irrespective of the pressure conditions within said second region.

13. A hydrostatic and gear transmission according to claim 1 wherein means are provided to pressurize said hydrostatic fluid in said first region.

14. A hydrostatic and gear transmission according to claim 13 wherein further means are provided to pressurize said first region.

15. A hydrostatic and gear transmission according to claim 12 wherein said partitioning device is provided with freedom to move in a vertical orientation with respect to said surface level of said gear lubricant in said second region.

16. A hydrostatic and gear transmission according to claim 1 wherein said partitioning device allows said hydrostatic fluid to escape from said first region to enter said second region when the expanded volume of said hydrostatic fluid in said first chamber has reached a maximum value corresponding to maximum deflection of said partitioning device.

17. A hydrostatic and gear transmission having a housing formation with an interior space divided into a hermetically sealed first region into which hydrostatic transmission components are disposed and a second region into which gear transmission components are accommodated by means of an internal flexible non-porous barrier, said internal flexible non-porous barrier performing to segregate said regions such that gear lubricant in contact on the one side is prevented from mixing with the hydrostatic power transmission fluid on the opposite side.

18. A hydrostatic and gear transmission according to claim 17 wherein said first region contains hydrostatic fluid whereas said second region contains gear lubricant; and wherein any volume change in the fluid capacity of said first region due to temperature change is assimilated by said internal flexible non-porous barrier to effect an equal but opposite volume change in said second region.

19. A hydrostatic and gear transmission according to claim 18 wherein responsive to changes in volume of said hydrostatic fluid within said first region, the surface level of said gear lubricant in said second region is altered for an improved power operating efficiency of said hydrostatic and gear transmission.

20. A hydrostatic transaxle comprising a housing structure defining a first cavity containing a hydrostatic transmission and a second cavity containing differential gearing and axle shafts coupled to the differential gearing, the hydrostatic transmission and differential gearing being operatively interconnected through an opening in a wall between the first and second cavities, and a deformable member mounted in said wall between the first and second cavities and within said housing structure, said deformable member displacing toward said second cavity responsive to expansion of oil in said first cavity during operation of said hydrostatic transmission, thereby to accommodate an expanded oil volume within said first cavity.

* * * * *